June 11, 1963 P. D. BROHAUGH 3,093,789
VOLTAGE REGULATOR FOR GENERATORS
Filed Dec. 26, 1961
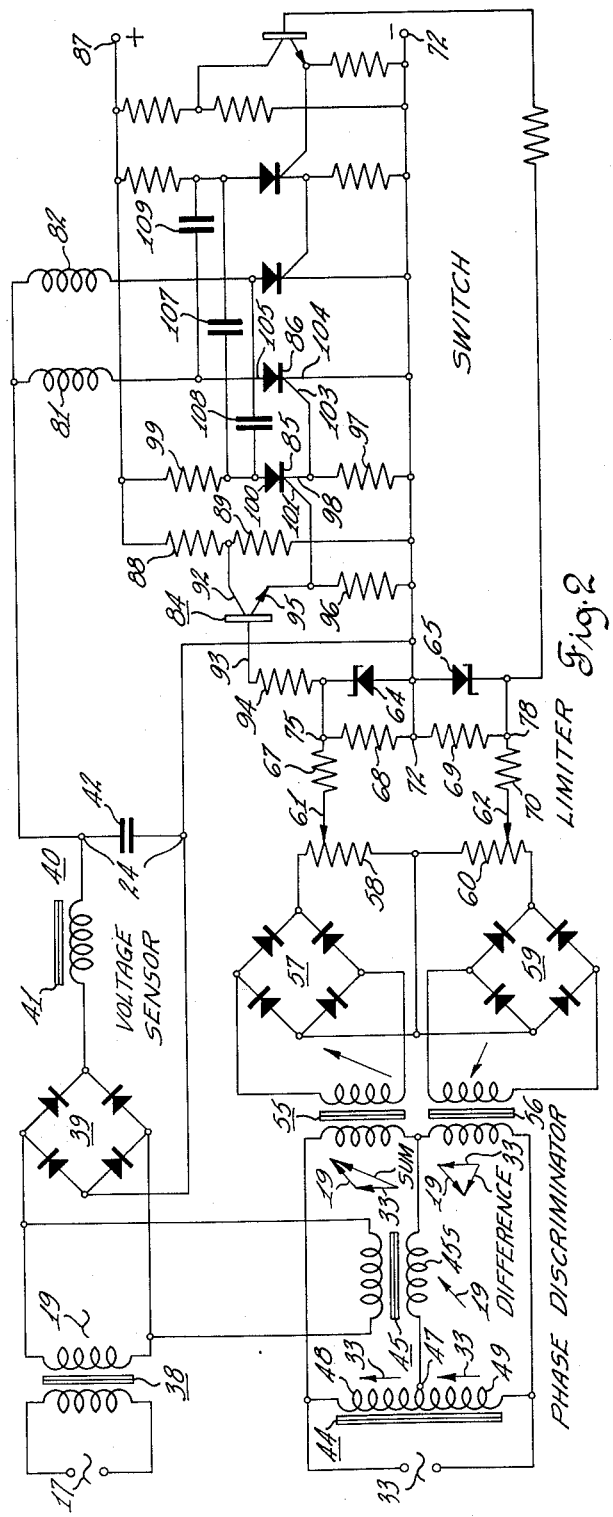
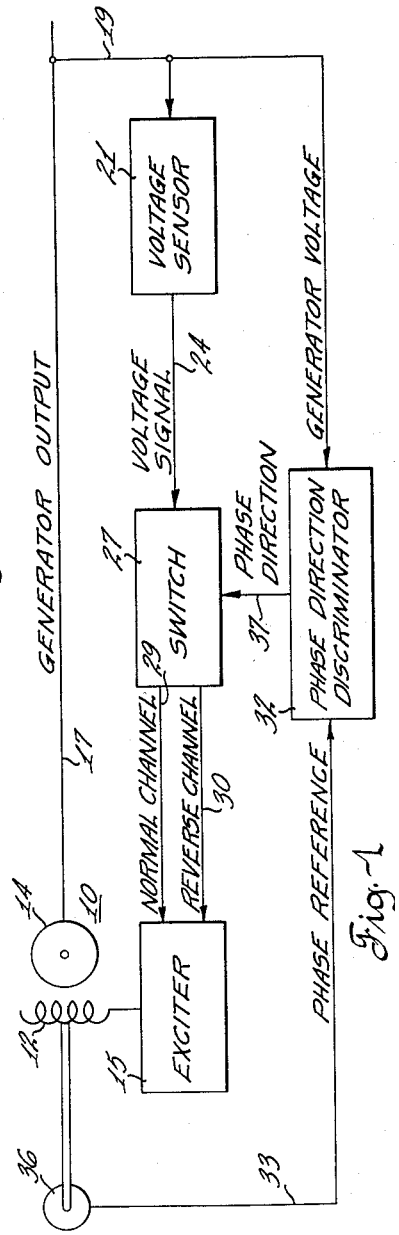
Inventor
Paul D. Brohaugh
By W. J. Roberts
Attorney 3,093,789
VOLTAGE REGULATOR FOR GENERATORS
Paul D. Brohaugh, Milwaukee, Wis., assignor to Allis-Chalmers Manufacturing Company, Milwaukee, Wis.
Filed Dec. 26, 1961, Ser. No. 161,930
8 Claims. (Cl. 322—20)

This invention relates to a voltage regulator for an alternating current generator. More specifically this invention relates to a regulator for varying the voltage of an alternating current generator through a range that includes zero voltage.

There are many applications for a generator that is variable over a wide voltage range that includes zero voltage. Testing insulation is an example. Alternating current generators have important advantages in providing a wide range voltage. For example, small power variations in the generator field winding vary the generator voltage greatly, and the alternating voltage of the generator can be stepped up to a very high voltage by a transformer. Unfortunately, an alternating current generator with a conventional voltage regulator is unstable near zero voltage. When the generator voltage is zero, a conventional regulator is liable to drive the generator uncontrollably to a high voltage. Consequently, generators with prior art regulators must keep far enough above zero voltage that random voltage variations will not bring the generator into the unstable voltage region.

A transformer that steps up the generator voltage also increases the unstable region near zero of the stepped up voltage. Thus, it is even more important to regulate a generator near zero voltage when the generator is combined with a transformer. The instability of conventional regulators near zero voltage very seriously limits the usefulness of an alternating current generator where a wide voltage range is required, and it prevents using an alternating current generator to provide zero voltage.

Voltage regulators vary the voltage of a generator by varying the current in a field winding the generator. The field current and the associated magnetic field can vary in polarity as well as in magnitude. In a direct current generator, the polarity of the field current establishes the polarity of the armature voltage. In an alternating current generator the field polarity establishes an analogous characteristic that will be called "phase direction." When the phase direction changes, the vectors that represent the phase and the magnitude of the voltage each change direction by 180°. Thus, phase direction like polarity has two states, a normal direction and a reverse direction. Phase direction differs from polarity in that polarity differences are readily apparent to prior art regulators, but phase direction differences are not. Whereas a regulator for a direct current generator responds distinctly and properly to both polarities, prior art regulators for alternating current generators do not distinguish between the two phase directions and they respond improperly in the reverse phase direction.

Taking into account the positive and negative field current polarities and the normal and reverse phase directions, the relationship between a field current change and the resulting voltage change is quite simple. A positive going current change produces a normal direction going voltage change. In other words, the magnitude of the voltage increases if the generator is operating in the forward phase direction and the magnitude decreases if the generator is in the reverse phase direction. The voltage responds in the opposite way to a negative going current change. A regulator should sense a deviation in the generator voltage and make the required change in the field current. However, prior art voltage regulators do not analyze the generator voltage in this straightforward way. They sense only the magnitude of the voltage and not its phase direction. Thus, to a regulator that is set to maintain zero voltage, both a normal direction voltage and a reverse direction voltage appear only to be high magnitude voltage deviations that require a negative going change in the field current. For a generator in the reverse phase direction, the negative going current change will further increase the voltage deviation. When a generator is set to maintain zero voltage, random voltage deviations occur in either phase direction and a deviation in the reverse phase direction can cause the regulator to drive the generator field to its maximum negative current value and drive the voltage to a high magnitude.

The regulator of this invention controls the voltage of an alternating current generator at zero voltage and at selected voltages in either phase direction. The regulator distinguishes between the two phase directions, and it produces an electrical output that varies continuously over two distinct ranges that correspond to the generator voltage in the two phase directions. A small auxiliary alternating current generator that is mechanically connected to rotate with the regulated generator provides a phase reference voltage, and a phase discriminator compares the phase of the generator voltage with the reference. The output voltage of the discriminator varies properly in magnitude and in polarity to control the generator voltage in either phase direction.

The specific regulator that will be described suppresses the magnitude variations of the discriminator output, and the discriminator indicates only the phase direction. The regulator also produces a polarity invariant signal that indicates only the generator voltage magnitude, and it switches the polarity of this signal in response to the output of the phase direction discriminator to provide the proper control signal for the generator.

One object of this invention is to provide a new and improved voltage regulator for an alternating current generator.

Another object of this invention is to provide a new and improved alternating voltage regulator that is stable at zero voltage.

Another object of this invention is to provide a regulator for controlling an alternating current generator in both a normal phase direction and a reverse phase direction.

Another object of this invention is to provide a regulator for controlling the excitation of an alternating current generator in two ranges of field excitation that are opposite in polarity.

Another object of this invention is to provide a new regulator for an alternating current generator that supplies a test voltage in a range that includes zero voltage.

Other objects and advantages of the invention will appear from the drawing and from the description of the invention.

FIG. 1 in the drawing is a block diagram of components of the regulator with order and information flow lines that show the functional relationships of the components; and FIG. 2 shows detailed components of the regulator.

FIG. 1 shows an alternating current generator 10 that uses the regulator of this invention. The generator 10 has a field winding 12 and an armature winding 14, and it has an exciter 15. The armature winding 14 is ordinarily a stationary winding and it has an electrical output 17. The single line 17 represents a physical system of current carrying conductors, and it also represents the flow of information about the phase and the magnitude of the generator voltage. Line 17 and similar lines in FIG. 1 will be referred to usually as the electrical quantities rather than as the physical conductors. The field winding 12 is ordinarily wound on a rotor that is driven by a suitable means such as an electric motor (not shown). The exciter 15 provides power for the field winding 12 in response to a relatively low power input from the regulator. The exciter 15 may comprise a direct current generator that operates on the linear portion of the saturation curve where relatively small changes in the field current of the exciter produce very large changes in the armature voltage of the exciter. In response to a suitable input (29, 30, described later) the exciter 15 varies the current in the field winding 12 over a continuous positive and negative range.

A measure of the generator output 17 provides a generator voltage signal 19. A voltage sensor 21 of any well known type rectifies the signal 19 and produces a voltage signal 24 that varies in magnitude (but not polarity) with the magnitude (but not the phase or phase direction) of the generator voltage signal 19. This polarity corresponds to only the normal phase direction, and the signal 24 cannot control the generator properly in the reverse phase direction.

The regulator includes a switch 27, preferably a semiconductor flip flop, that is controlled to switch the polarity of the voltage signal 24 as the phase direction of the generator output 17 changes. Switching the polarity of the signal 24 provides a distinct voltage polarity and magnitude signal for each generator voltage in the two phase directions. The switch 27 has a normal output channel 29 and a reverse output channel 30. In the regulator of the drawing, the switch 27 establishes the polarity of the signal 24 by switching the signal 24 to one of two oppositely wound control windings (81, 82 in FIG. 2) of the exciter 15. Those skilled in the art will recognize that the output of the switch 27 can be adapted to control other types of exciters.

A phase direction discriminator 32 controls the switch 27. The discriminator 32 receives the generator voltage signal 19 and it receives a phase reference signal 33. A small alternating current generator 36 that is mechanically coupled to rotate with the rotor of the generator 10 produces the phase reference 33. The generator 36 is otherwise independent of the generator 10, and the phase difference between the two generator voltage signals 19 and 33 indicates the phase and the phase direction of the generator voltage 17.

The phase direction discriminator 32 compares the phase of the generator voltage signal 19 with the phase reference 33. When the phase difference of the two signals 19, 33 indicates that the generator output 17 is in the normal phase direction, the discriminator 32 produces a phase direction output 37 that signals the switch 27 to connect the voltage signal 24 to the normal channel 29 of the exciter 15. When the phase difference of the two signals indicates that the generator output 17 is in the reverse direction, the discriminator 32 signals switch 27 to connect the signal 24 to the reverse channel 30.

When the regulator is set to maintain the generator 10 at zero voltage, the generator output voltage 17 tends to vary around zero in both the normal phase direction and the reverse phase direction. When the generator is in the normal phase direction, the magnitude of the voltage signal 24 represents the magnitude of the generator output voltage 17 and the polarity of the voltage signal 24 properly represents the normal phase direction. In this situation the phase discriminator 32 and the switch 27 connect the signal 24 to the normal channel 29 of the exciter. When the phase direction reverses, the magnitude of the voltage signal 24 still represents the magnitude of the generator voltage 17, but the polarity of the signal 24 is incorrect for the reverse phase direction. In this situation the phase discriminator 32 and the switch 27 connect the voltage signal to the reverse channel 30 where it properly controls the exciter 15.

When the regulator is set to maintain a voltage other than zero, the switch 27 switches from one channel 29 or 30 to the other whenever the field current varies enough to change the phase direction.

FIG. 2 shows detailed circuits that correspond to the voltage sensor 21, the phase direction discriminator 32 and the switch 27 of FIG. 1. The specific circuits will suggest numerous other components for the functional boxes of FIG. 1.

A transformer 38 receives the generator output voltage 17 and produces the voltage 19 which drives the exciter 15 and provides a generator phase signal for the discriminator 32.

In the voltage sensor 21, a full wave rectifier 39 rectifies the generator voltage signal 19, and a filter 40 comprising an inductor 41 and a capacitor 42 filters the output of the rectifier 39 and produces the voltage signal 24 across the capacitor 42. The rectifier 39 and the filter 40 remove the phase and phase direction information of the signal 19. The output 24 of the voltage sensor 21 varies in magnitude (but not in polarity) with the magnitude (but not the phase) of the generator voltage signal 19.

Two transformers 44, 45 introduce the generator voltage signal 19 and the phase reference voltage signal 33 into the phase discriminator circuit. Vectors in the drawing represent the voltages associated with the components of the circuit. A center tap 47 divides the single winding of the reference voltage transformer 44 into two portions 48 and 49, and the secondary winding 45s of the generator voltage transformer 45 is connected to the center tap 47. The winding 45s and the winding portion 48 produce the sum of the two voltages 19 and 33, and the winding 45s and the winding portion 49 produce the difference of the two voltages 19 and 33. The sum and the difference voltages appear across two transformers 55, 56 that isolate the transformers 44 and 45 from succeeding components of the discriminator.

When the generator voltage signal 19 is in the forward phase direction (as the vectors illustrate), the sum of the two voltages 19 and 33 is greater than the difference. In the reverse phase direction, the difference is greater than the sum. Thus, the relative magnitudes of the voltages across the transformers 55 and 56 indicate the phase direction.

The phase discriminator rectifies the sum and difference voltages to produce voltage magnitude signals, and it compares the two rectified voltages to determine the phase direction. A rectifier 57 is connected to the transformer 55 and provides across a resistor 58 a rectified voltage that is proportional to the alternating sum voltage. Similarly, a rectifier 59 provides across a resistor 60 a rectified voltage that is proportional to the difference voltage. The negative terminals of the two resistors 58 and 60 are connected together. Thus, the positive terminal of the resistor 58 may be either positive or negative with respect to the positive terminal of the other resistor 60, depending on the phase direction. The resistors 58, 60 have taps 61, 62 for adjusting this voltage.

The output of the phase discriminator at the taps 61, 62 varies in polarity and magnitude in the proper way to control the exciter 15 to maintain zero voltage. As the arrows suggest, the magnitude of the output of the phase discriminator varies with the magnitude of the generator output voltage 19 in somewhat the same way as the output of the voltage sensor 21. Since the polarity of the phase discriminator output reverses when the phase direction reverses, the phase discriminator itself might satisfactorily regulate the generator for zero voltage without the voltage sensor or the switch 27. If the output of the phase discriminator is fed into the normal channel 29 of the exciter 15 or into the field winding 12, it would tend to maintain the field at the proper excitation for zero output voltage.

Although the phase discriminator by itself would regulate the generator satisfactorily for some purposes, it is unsatisfactory in many situations because the output voltage varies with small changes in the phase of the voltage 19. The circuit includes a limiter that limits the voltage magnitude variations in the output of the phase discriminator. When the voltage signal 19 is not zero, the output of the limiter is a substantially constant voltage of one polarity or the other. Thus, the phase discriminator and the limiter together comprise a phase direction discriminator.

The limiter comprises two zener diodes 64, 65 and a series connected array of four resistors 67, 68, 69, 70. The two ends of the series array are connected to the two variable taps 61, 62 of the voltage comparing resistors 58, 60. The common connection 72 of the two resistors 68 and 69 is the common terminal for two outputs of the limiter. With respect to the common terminal 72, the two resistors 67 and 68 on one side have one polarity and the two resistors 69 and 70 on the other side have the opposite polarity. The common connection 75 of the two resistors 67, 68 on one side of the common output terminal 72 forms an output terminal of the limiter and the common terminal 78 of the other two resistors 69, 70 forms a complementary output terminal. Thus the three terminals 72, 75, and 78 correspond to the phase direction line 37 in FIG. 1. The portion of the voltage across the variable taps 61, 62 that appears across the two resistors 68 and 69 is the output voltage of the limiter.

The two zener diodes 64, 65 are connected to limit the voltage that appears across the output resistors 68, 69. The anode of each of the two zener diodes is connected to the common output terminal 72. The cathodes of the zener diodes are each connected to one of the output terminals 75, 78. Thus, each diode presents a low impedance to a negative voltage at either of the discriminator output terminals 61 and 62. All of the voltage of the negative side of the limiter appears across the resistor 67 or 70 which is in series with the negative cathode diode, and none of the voltage appears across the resistor 68 or 69 that is in parallel with the negative cathode diode 64 or 65. The diode 64 or 65 that is connected to the positive terminal 75 or 78 of the resistor array does not influence the output voltage until the output voltage reaches the breakdown voltage of the diode. The positive cathode diode then conducts in its reverse direction and prevents an increase in voltage across its associated resistor 68 or 69. Any increase in voltage at the discriminator output 61, 62 appears only across the resistor 67 or 70 that is in series with the reverse conducting diode. Thus, one output terminal 75 or 78 of the limiter has zero voltage with respect to the terminal 72 and the other terminal 75 or 78 has a positive voltage within a narrow voltage range.

FIG. 2 also shows a semiconductor flip flop that switches the output 24 of the voltage sensor 21 to the normal channel 29 or to the reverse channel 30 of the exciter 15. The normal channel 29 feeds a winding 81 and the reverse channel 30 feeds a similar winding 82 of the opposite polarity. The flip flop has two complementary sections, and corresponding components in the two sections have the same number.

Each section of the flip flop comprises an NPN type amplifying transistor 84, an auxiliary controlled rectifier 85, and a switching controlled rectifier 86. A suitable power supply for the transistors 84 and the auxiliary controlled rectifiers 85 is connected between the terminal 72 (negative) and a terminal 87 (positive). The appropriate switching controlled rectifier 86 connects one of the windings 81 or 82 to the output 24 of the voltage sensor 21, and the transistors 84 and the auxiliary controlled rectifiers 85 turn on and off the switching controlled rectifiers 86 in response to the output 37 of the phase direction discriminator.

Two resistors 88, 89 form a voltage divider for energizing the transistor 84 from the same source as the auxiliary controlled rectifier 85 but at a lower voltage. The collector 92 of the transistor is connected to the midpoint of the voltage divider, the base 93 of the transistor is connected through a gain adjusting resistor 94 to one of the output terminals 75, 78 of the phase discriminator, and the emitter 95 is connected to the terminal 72 through a coupling resistor 96. A positive voltage at one of the terminals 75 or 78 produces a forward biasing current in the base emitter circuit of the associated transistor and a corresponding current flows in the coupling resistor 96 and the collector circuit of the transistor.

The resistor 97 connects the cathode 98 of the auxiliary controlled rectifier 85 to the terminal 72, and a resistor 99 connects the anode 100 to the point of positive potential 87. The gate terminal 101 of the auxiliary controlled rectifier 85 is connected to the coupling resistor 96 of the transistor 84. When collector current flows in the transistor 84, a corresponding current flows in the gate circuit of the associated auxiliary controlled rectifier 85. The cathode resistor 97 of the auxiliary controlled rectifier 85 couples the auxiliary controlled rectifier to the gate terminal 103 of the switching controlled rectifier 86. The cathode 104 of the switching controlled rectifier is connected to the terminal 72, and the anode 105 of the switching controlled rectifier is connected to its associated winding, 81 or 82, of the exciter 15. When the auxiliary controlled rectifier 85 conducts, its cathode resistor 97 couples a gating current to the switching controlled rectifier 86 and it gates the switching controlled rectifier. When the switching controlled rectifier conducts, the associated input winding 81 or 82 of the exciter is energized by the voltage sensor 21 to make the appropriate changes in the field excitation.

When the phase direction of the generator 10 reverses, the output 37 of the phase discriminator switches on the previously nonconducting section of the flip flop, and the oncoming section switches off the previously conducting section. When the potential at the base 93 of the transistor 84 of the offgoing section changes to nearly zero, the transistor stops conducting. However, the controlled rectifiers 85, 86 of the offgoing section remain conducting. When the transistor 85 of the oncoming section begins conducting in response to a positive potential at its base terminal, it gates the auxiliary controlled rectifier 85 of the oncoming section. The oncoming auxiliary controlled rectifier 85 switches off the offgoing section of the flip flop by momentarily reducing the potential across the cathode and the anode of the two controlled rectifiers 85, 86 of the offgoing section. The anode 100 of the oncoming auxiliary controlled rectifier 85 is at the potential of the positive source 87 before the auxiliary controlled rectifier begins conducting. When the auxiliary controlled rectifier 85 conducts in response to a positive input to its associated transistor 84, the potential of its anode 100 approaches the potential of the negative terminal 72 because of the voltage drop across the anode resistor 99. A capacitor 107 couples the negative going voltage of the anode 100 of the oncoming auxiliary controlled rectifier 85 to the anode 100, of the auxiliary offgoing controlled rectifier 85, and complementary capacitors 108 and 109 couple the anodes of the auxiliary controlled rectifier 85 of each section to the switching controlled rectifier of the other section. This negative going voltage momentarily reduces the voltage across the controlled rectifiers 85 and 86 of the other offgoing section to a point where these controlled rectifiers will not conduct until they receive a gate current. Thus, the offgoing section remains nonconducting until the generator output phase direction reverses and the discriminator provides a positive voltage to the base of its transistor.

As the control has been described so far, the generator 10 responds to a signal that is derived from the generator voltage signal 19 and indicates an error in the generator output 17. When the regulator is set to maintain zero voltage, any voltage at the generator output 17 is an error, and the regulator operates on the generator field 12 to reduce the error to zero. To operate the generator at a selected voltage other than zero, a reference voltage of the proper polarity and magnitude is introduced into the circuit so that the difference between the reference voltage and the voltage derived from the generator output 17 is zero when the generator 10 has the selected voltage output. The reference voltage circuit may be of any desired type and it may introduce the reference voltage into the regulator circuit at any suitable point after the output 29, 30 of the switch 27 (or after the output 37 of the phase discriminator if the magnitude of the phase discriminator controls the generator). For example, a third winding adapted to balance the windings 81 or 82 at the selected voltage is a satisfactory reference. Thus, FIG. 2 illustrates the control when the reference voltage is set for zero and the reference voltage circuit is in effect disconnected from the circuit.

The specific circuits and the general arrangement of the regulator that have been described will suggest to those skilled in the art numerous variations in circuit detail and component relationships within the spirit of the invention and the scope of the claims.

Having now particularly described and ascertained the nature of my said invention and the manner in which it is to be performed, I declare that what I claim is:

1. A voltage regulator for an alternating current generator having an output voltage that varies in phase direction as the polarity of the generator excitation varies, comprising,
    means mechanically connected to a rotating element of the alternating current generator for producing a phase reference,
    means connected to be responsive to said phase reference and to the generator output voltage to produce an electrical signal varying in magnitude with the magnitude of the generator output voltage and varying in polarity with the phase direction of the generator, and
    means connected to receive said electrical signal to vary the excitation of the generator.

2. A regulator for an alternating current generator comprising
    a voltage sensor for producing signal voltages corresponding in a first range to generator voltage magnitudes in one phase direction of the generator and corresponding in a second range to generator voltage magnitudes in the opposite phase direction, the signal voltages which indicate generator voltages that are equal in magnitude but opposite in phase direction being indistinguishable,
    a phase reference generator,
    a phase direction discriminator responsive to the phase of the alternating current generator and to said phase reference generator to distinguish between said two phase directions, and
    means operating on said signal voltages in response to said phase direction discriminator to produce distinct generator control voltages corresponding to equal generator voltage magnitudes in the two phase directions.

3. A control for an exciter of an alternating current generator having a forward phase direction and a reverse phase direction according to the polarity of its excitation, comprising,
    means producing a signal indicating the generator phase,
    rectifier means producing a polarity invariant signal that indicates the magnitude of the generator voltage,
    means mechanically coupled to a rotating element of the generator to provide a phase reference signal,
    phase discriminator means comparing said phase reference signal with said generator phase signal and producing an output indicating the phase direction of the generator, and
    means responsive to said discriminator output for switching said polarity invariant signal to an input of the exciter when the generator is in the forward phase direction and switching said polarity invariant signal away from said input when the generator is in the reverse phase direction.

4. A regulator for an alternating current generator having an output voltage which may be zero magnitude and which may vary in phase in a normal phase direction and in a reverse phase direction as the voltage magnitude varies around zero, comprising,
    means providing an electrical signal indicating the phase and the magnitude of the generator output voltage,
    means providing an electrical phase reference signal,
    circuit means comparing the phase and the magnitude of said generator output indicating signal with said phase reference signal and producing an electrical output that varies in magnitude with the magnitude of the generator output voltage and varies in polarity with the phase direction of the generator output, and
    means responsive to said output of said circuit means to vary the excitation of the generator to maintain zero output voltage.

5. A control for an alternating current generator having a normal phase direction and a reverse phase direction according to the polarity of the generator field, comprising
    means providing an electrical signal that indicates the phase of the generator voltage,
    means mechanically coupled to the generator to provide a phase reference signal,
    phase discriminator means responsive to said phase reference signal and to said generator phase signal to produce a first polarity output when the generator is in the normal phase direction and to produce a second polarity output when the generator is in the reverse phase direction, and
    means connected to receive said output of said phase discriminator and to provide a field current for the generator, the polarity of said field current varying as the polarity of said phase discriminator output varies.

6. A regulator for an alternating current generator comprising
    a voltage sensor producing a polarity invariant magnitude varying electrical signal that indicates the voltage magnitude and the phase direction of the generator when the generator is in the normal phase direction and indicates the voltage magnitude but not the phase direction of the generator when the generator is in the reverse phase direction,
    a phase reference generator,
    a phase direction discriminator responsive to the phase of the alternating current generator and to said phase reference generator to distinguish between said two phase directions, and
    means operating on said polarity invariant signal in response to said phase direction discriminator to reverse the polarity of said signal when the generator is in the reverse phase direction.

7. A control for the direct current exciter of an alternating current generator, comprising
    a voltage sensor for producing a polarity invariant voltage that indicates the magnitude of the generator voltage,
    phase reference means mechanically connected to rotate with the alternating current generator to produce a phase reference voltage,
    a phase direction discriminator comparing the generator voltage and said phase reference voltage and producing a two condition output indicating the phase direction of the generator, and
    means responsive to said output of said phase direction discriminator to supply said polarity invariant voltage in one polarity to control the exciter when the generator is in one phase direction and to supply said polarity invariant voltage in the opposite polarity to control said exciter when the generator is in the other phase direction.

8. A control for the direct current exciter of an alternating current generator, comprising
   a voltage sensor producing a polarity invariant voltage that indicates the magnitude of the generator voltage,
   a phase reference generator mechanically connected to rotate with the alternating current generator to produce a phase reference voltage,
   a phase discriminator comparing the generator voltage and the phase reference voltage and producing a first output when the alternating current generator is in one phase direction and a second output when the alternating current generator is in the other phase direction, and
   switch means differently responsive to said first and second outputs of said phase discriminator to supply said polarity invariant voltage in one polarity to control the exciter when the generator is in one phase direction and in the opposite polarity when the generator is in the other phase direction.

References Cited in the file of this patent

UNITED STATES PATENTS

| | | |
|---|---|---|
| 2,672,585 | Hotson | Mar. 16, 1954 |
| 3,032,700 | Cecil et al. | May 1, 1962 |